April 28, 1942.  R. C. DATIN  2,280,895
APPARATUS AND METHOD FOR DISPERSING LIQUIDS
Filed Aug. 12, 1939
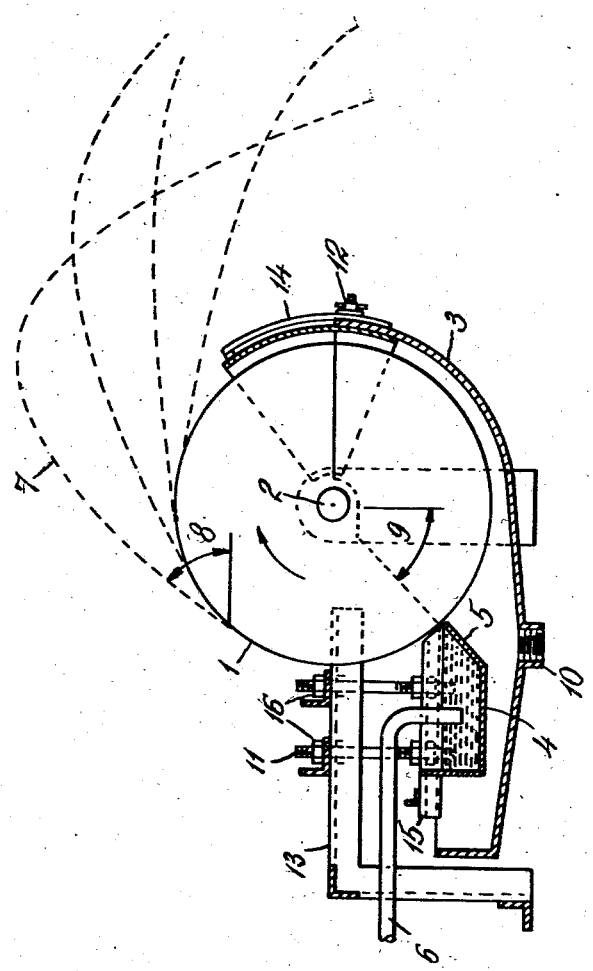
INVENTOR
Richard C. Datin
BY
Benjamin Sweedler
ATTORNEY

UNITED STATES PATENT OFFICE 2,280,895

APPARATUS AND METHOD FOR DISPERSING LIQUIDS

Richard C. Datin, Petersburg, Va., assignor to The Solvay Process Company, New York, N. Y., a corporation of New York Application August 12, 1939, Serial No. 289,931

9 Claims. (Cl. 83—91)

This invention relates to a method and apparatus for dispersing liquids or slurries. The term "liquid" is used herein to include liquids, slurries, and melts.

It has been proposed heretofore to disperse liquids in the form of a spray by means of nozzles, rotating horizontal discs, and rotating discs or drums dipping into the surface of a body of the liquid. Nozzles have been found to be subject to plugging, particularly when dispersing melts or slurries, and are in general of too complex construction to be depended upon for efficient operation. Rotating discs and drums heretofore used have been found unsatisfactory in that the spray formed thereby tends to spread over too great an area and its trajectory is not readily controlled; moreover, control of the spray particle size has been unsatisfactory, uniform reproduceable results have in general not been obtained, and power requirements have been high.

It is an object of this invention to provide an apparatus and a method for spraying a liquid so as to obtain uniform particles of a desired size and to provide for dispersion of the liquid with high efficiency, i. e. with uniform results under continuous operation and with low power costs.

I have discovered a uniform spray of controlled trajectory is obtained with highly efficient operation when a liquid is dispersed centrifugally in the form of a spray from the surface of a rotating horizontal cylinder fed by a body or stream of the fluid maintained in contact with a limited area of the cylinder on its ascending side. I have found such dispersion may be accomplished by a rotating horizontal drum to which liquid is fed by means of a liquid conduit containing a barrier, e. g. a weir box containing a weir, over which the liquid flows, said weir being positioned closely adjacent to the rotating drum on its ascending side. I have found further the trajectory of the spray and the size of the particles formed may be controlled by regulating the speed of rotation of the cylinder or drum, the depth of liquid above the weir, and the position of the weir with respect to the drum surface.

In practicing my invention a drum, which may be about 6 to 30 inches, preferably about 20 to 24 inches in diameter, and which may be heated with steam, flue gas or the like when used for dispersing a liquid which must be maintained molten, is rotated at a rate sufficient to throw from its surface by centrifugal force particles of liquid distributed thereon as a liquid film, a peripheral speed of 18 to 21 feet per second being preferred. A shield may be provided to intercept that part of the spray stream which leaves the drum at a substantial angle below the horizontal. Liquid to be dispersed is distributed on the drum surface along a predetermined area on the ascending side of the drum, e. g. by providing along said area a liquid conduit containing a barrier or weir over which liquid flows, the weir being set closely adjacent to the drum surface, i. e. with a clearance of no more than .07 inch and preferably about .01 inch or less.

A sufficient depth of liquid is maintained in the conduit so that the liquid level is maintained above the top of the weir, thus providing a supported body of liquid in contact with the drum surface above the weir. The capacity per unit length of cylindrical surface and the coarseness of the spray may be controlled by the depth of liquid maintained above the weir and by the peripheral velocity of the revolving surface. The point at which sprayed particles first leave the drum surface is determined primarily by the position of the weir on the circumference of the rotating drum, the peripheral velocity of the drum and the depth of liquid above the weir. It has been found advantageous to locate the weir at a point 30 to 60°, preferably 45°, from the lowermost portion of the drum, measuring the angle upwardly along the ascending side of the drum. The adhering film of liquor under the conditions stated, it has been found, starts to be thrown tangentially from the drum surface 60 to 90° beyond the weir setting in the direction of rotation of the drum. Liquid recovered from the back-flow between the weir and the drum and from the shield may be recycled to the conduit containing the weir.

When using the dispersing unit of my invention for spray-drying or spray-solidifying a liquid to obtain solid particles, one or more of the above-described drum and weir units are placed near the top of a spray tower providing a sufficient distance of free fall so that the particles collected in a hopper at the bottom of the tower will be sufficiently solid to retain their shapes and not adhere to each other. For example, in solidifying ammonium nitrate-limestone slurry to form solid pebbles, a free fall of at least 50 feet, and preferably 75 feet or more, through air at atmospheric temperature has been found desirable. The sprayed stream, it has been found, rises to a height of 2 to 3 feet above the drum and falls in a rectangular area at the base of the tower about as wide as the drum and about 18 to 20 feet long.

The method and apparatus of my invention have been found much superior to those heretofore known for spray-drying or spray-solidification of a liquid. I have found, for example, that under otherwise equivalent conditions the use of a weir feed for a drum, according to my invention, leads to production of substantially larger particles than a drum dipping into the surface of a body of liquid. Moreover, particles produced according to my invention have been found to be more uniform in size. For example, in spraying an ammonium nitrate-limestone slurry, 45 to 80% of the product was found to be in the form of spherical particles larger than 10-mesh, and little or none was larger than 8-mesh. Furthermore, the use of a weir feed for a rotating drum allows better control and more efficient direction of the path of the spray stream and results in less power loss due to fluid friction than in the case of a rotating drum dipping into the surface of a body of liquid. Projection of the spray in an accurately determined trajectory makes it necessary to utilize a smaller proportion of the space above the drum for the falling particles, and, accordingly, the use of smaller towers and collecting hoppers is made possible.

On the accompanying drawing is illustrated diagrammatically a preferred embodiment of my invention.

Reference numeral 1 indicates a horizontal smooth-surfaced drum rotatable about its axis 2. Means (not shown) are provided for rotating the drum at a rate sufficient to throw particles of fluid from its surface. The drum is partially surrounded by a shield 3 to intercept a part of the spray thrown from the drum surface. Reference numeral 4 indicates a liquid conduit, i. e. a weir box, provided with a weir 5 adjacent to but not touching a horizontal line along the drum surface. A desired depth of liquid is built up behind and above the weir 5, the liquid entering the conduit through the feed line 6. There is thus maintained a body of liquid in contact with the ascending side of the rotating drum and a film of liquid is thereby distributed on the drum surface. Liquid thus distributed is thrown tangentially from the drum surface by centrifugal force, the reference numeral 7 indicating the path of the particles first thrown from the drum. Reference numeral 8 denotes the angle of said path 7 with the horizontal, and reference numeral 9 indicates in terms of angular displacement from the lowermost point of the drum the position of the weir on the drum surface. A fluid return 10 is provided to recycle fluid spray intercepted by the shield 3 as well as the backflow from the weir 5.

The shield 3 is constructed so that one portion thereof may be adjusted through an angular displacement of 30 to 90° from the vertical, measured along the periphery of the drum in the direction of rotation indicated by the arrow on the drum. The adjustment may be accomplished, for example, by providing the movable upper portion of shield 3 with a slotted plate 14 which can be fixed in the desired position by tightening lock nuts on bolts 12 attached to the fixed part of the shield 3 and extending through the slots in the plate 14. An angular displacement of this shield of 45° is preferred. The weir also is preferably made adjustable both radially and circumferentially with respect to the drum. These adjustments may be accomplished by vertical and horizontal movement of the weir box 4 to which the weir 5 is attached. The means shown on the drawing to change the position of the weir box include the rods 11 which are suspended from the frame 13 by nuts 16 and extend through slots in this frame. The lower ends of the rods 11 are fastened to straps 15 attached to the weir box 4. To adjust the weir horizontally the rods 11 are moved horizontally in the slots in the frame 13 and fixed in the desired position; to adjust the weir vertically the rods 11 are raised by turning the lock nuts 16. The weir is positioned to provide a clearance of not more than .07 inch between the weir 5 and the drum surface, and to vary the angular displacement of the weir 5 from the vertical, measured along the periphery of the drum in the direction of rotation, through an angle of 30 to 60° from the lowermost point of the drum; as above indicated, a 54° displacement as shown on the drawing is preferred.

When the above-described unit is used for dispersing a liquid which must be maintained molten the drum may be internally heated by means of steam or flue-gas or the like and the shield 3, conduit 4, and lines 6 and 10 may be jacketed to maintain any desired temperature. When used for spray-drying or spray-solidification, the above-described unit is positioned near the top of a spray tower with clearance above the unit for the necessary rise of the sprayed particles leaving the drum surface.

The following example illustrates the application of my invention to the pebbling (i. e. the dispersion and solidification) of melts or highly concentrated solutions.

A hot slurry of pulverized dolomite in ammonium nitrate-water (over-all analysis 22.48% total nitrogen, 4.12% $H_2O$) was fed to the liquid conduit of a drum and weir dispersing unit such as is illustrated in the accompanying drawing. A drum 24 inches in diameter rotated at 191 R. P. M. (peripheral speed 20.9 feet per second) was used. The slurry was maintained at a temperature of about 116° C. and the drum was heated internally by means of steam. The weir was positioned at an angle of 60° to the vertical (i. e. the angle 9 on the accompanying drawing was 60°) and the liquid level was maintained about .3 inch above the top of the weir. Under these conditions the slurry was dispersed at the rate of about 1580 pounds per hour for each foot of drum length and the path of particles first leaving the drum was within the range 45 to 60° above the horizontal (i. e. the angle 8 on the accompanying drawing was in the range 45 to 60°). The sprayed particles were allowed to drop through air at atmospheric temperature for a distance of 85 feet and were there collected in a hopper. A sample was found to have the following screen analysis:

| Screen | Cumulative percent retained |
|---|---|
| 6-mesh | 0.0 |
| 8-mesh | 0.9 |
| 10-mesh | 66.0 |
| 14-mesh | 75.6 |
| 20-mesh | 89.9 |
| 28-mesh | 98.3 |
| 35-mesh | 99.6 |

A hot melt of sodium nitrate containing substantially no water maintained at a temperature of 340° C. may be dispersed as described above. A uniform product of sodium nitrate pebbles is thereby obtained.

The above description of the application of my invention to pebbling of ammonium nitrate-limestone slurry and molten sodium nitrate is intended for purposes of exemplification only and my invention is not to be limited thereby. My method and apparatus for dispersing solutions, slurries, or melts may be applied to all liquids or slurries capable of being thrown from the drum surface by centrifugal force in the form of a spray of discrete particles.

I claim:

1. Apparatus for dispersing a liquid comprising a horizontal drum rotatable on its axis, a liquid conduit and weir positioned with said weir adjacent to but not touching a line along the ascending side of said drum, the clearance between the weir and the drum surface being no more than .07 inch, means for adjusting the position of said weir relative to said drum surface, means for supplying liquid to said conduit so as to overflow said weir onto the ascending surface of the drum, and means for rotating the drum at a rate sufficient to throw particles of liquid from its surface.

2. Apparatus for dispersing a liquid comprising a horizontal drum rotatable on its axis, a liquid conduit and weir positioned with said weir adjacent to but not touching a predetermined horizontal line along the ascending side of said drum, the clearance between the weir and the drum surface being not more than .07 inch, means for adjusting the position of said weir both radially and circumferentially with respect to the drum surface, means for supplying liquid to said conduit so as to overflow said weir onto the ascending surface of the drum, means for rotating the drum at a predetermined rate sufficient to throw particles of liquid from its surface, and a shield positioned to intercept a portion of the spray thrown from the drum at an angle below the horizontal.

3. A dispersing apparatus comprising in combination a substantially horizontal cylinder rotatable on its axis to disperse centrifugally from its surface particles of a liquid fed thereto, and liquid feeding means outside the cylinder for producing a film of liquid on the cylinder, said means having a discharge portion adjacent to a portion of the cylinder located from about thirty to about sixty degrees from the lowermost portion of the cylinder, measuring the angle upwardly along the ascending side of the cylinder, and so positioned in relation to the cylinder that a body of liquid is maintained in contact with a limited area of the ascending side only of the cylinder and said body of liquid lies at least in part above said adjacent portion of the cylinder and feeding means.

4. A dispersing apparatus comprising in combination a substantially horizontal cylinder rotatable on its axis to disperse centrifugally from its surface particles of a liquid fed thereto, and liquid feeding means outside the cylinder for producing a film of liquid over a limited area on the ascending side of said cylinder, the said means comprising a liquid conduit ending in a weir over which said liquid flows onto the surface of the cylinder, the said weir being adjacent to a portion of the cylinder located about forty-five degrees from the lowermost portion of the cylinder, measuring the angle upwardly along the ascending side of the cylinder, and the said weir being so positioned with respect to the cylinder that a body of liquid lying at least in part above the weir is maintained in contact with a portion of the ascending side only of the cylinder.

5. A dispersing apparatus comprising in combination a substantially horizontal cylinder rotatable on its axis to disperse centrifugally from its surface particles of a liquid fed thereto, liquid feeding means outside the cylinder for producing a film of said liquid over a limited area on the ascending side of said cylinder, the said means comprising a liquid conduit ending in a weir over which said liquid flows onto the surface of the cylinder, the said weir being adjacent to a portion of the cylinder located within the area ranging from about thirty to about sixty degrees from the lowermost portion of the cylinder, measuring the angle upwardly along the ascending side of the cylinder, and the said weir being so positioned with respect to the cylinder that a body of liquid lying at least in part above the weir is maintained in contact with a portion of the ascending side only of the cylinder, and means for rotating the cylinder at a rate sufficient to discharge liquid in the form of discrete particles from the surface of the cylinder.

6. Apparatus for dispersing a liquid comprising a substantially horizontal drum rotatable on its axis, a liquid conduit and weir positioned with said weir adjacent to but not touching a substantially horizontal line located within the area ranging from about thirty to about sixty degrees from the lowermost portion of the drum, measuring the angle upwardly along the ascending side of the drum, the clearance between the weir and the drum surface being no more than .07 inch, means for adjusting the position of said weir relative to said drum surface, means for supplying liquid to said conduit so as to overflow said weir onto the ascending surface of the drum, and means for rotating the drum at a rate sufficient to throw discrete particles of liquid from its surface.

7. Apparatus for dispersing a liquid comprising a substantially horizontal drum rotatable on its axis, a liquid conduit and weir positioned with said weir adjacent to but not touching a predetermined horizontal line located within the area ranging from about thirty to about sixty degrees from the lowermost portion of the drum, measuring the angle upwardly along the ascending side of the drum, the clearance between the weir and the drum surface being about .01 inch, means for adjusting the position of said weir both radially and circumferentially with respect to the drum surface, means for supplying liquid to said conduit so as to overflow said weir onto the ascending surface of the drum, means for rotating the drum at a predetermined rate sufficient to throw discrete particles of liquid from its surface, and a shield positioned to intercept a portion of the spray thrown from the drum at an angle below the horizontal.

8. A method of pebbling a hot limestone-ammonium nitrate-water slurry which solidifies when cooled to ordinary temperatures comprising maintaining a body of said slurry in contact with a part of a rotating cylindrical surface, the part of the surface in contact with the body of slurry being located at an angle of about thirty to sixty degrees from the lowermost portion of the surface, measuring the angle upwardly along the ascending side of the drum, thus producing on said ascending side of the surface over a limited area thereof a film of said slurry, the remaining area of said rotating cylindrical surface being maintained out of contact with a body of said slurry, rotating said cylindrical surface at a peripheral speed of about eighteen to twenty-one feet per second, whereby particles of said slurry are discharged from the surface of the cylinder, and allowing said particles to fall freely and solidify.

9. A method of pebbling a hot melt of sodium nitrate substantially free from water comprising maintaining a body of said melt in contact with a part of a rotating cylindrical surface, the part of the surface in contact with the body of melt being located at an angle of about thirty to sixty degrees from the lowermost portion of the surface, measuring the angle upwardly along the ascending side of the drum, thus producing on said ascending side of the surface over a limited area thereof a film of said melt, the remaining area of said rotating cylindrical surface being maintained out of contact with a body of said melt, rotating said cylindrical surface at a peripheral speed of about eighteen to twenty-one feet per second whereby particles of said melt are discharged from the surface of the cylinder, and allowing said particles to fall freely and solidify.

RICHARD C. DATIN.